United States Patent [19]

Liska et al.

[11] 3,831,075

[45] Aug. 20, 1974

[54] CONTROL SYSTEM FOR POSITIONING A MOTOR-DRIVEN POTENTIOMETER

[75] Inventors: Manfred Liska, Nurnberg; Hans Kühnlein, Grossgrundlach; Georg Kögler, Schwabach, all of Germany

[73] Assignee: Siemens Aktiengesellschaft, Munich, Germany

[22] Filed: Mar. 12, 1973

[21] Appl. No.: 340,057

[30] Foreign Application Priority Data
Mar. 13, 1972 Germany............................ 2212110

[52] U.S. Cl................................. 318/596, 318/666
[51] Int. Cl............................................. G05b 1/06
[58] Field of Search .......... 318/592, 596, 597, 663, 318/674, 678, 561, 620, 666

[56] References Cited
UNITED STATES PATENTS
2,796,569  6/1957  McDonald.......................... 318/596
3,419,775  12/1968  Kardos.............................. 318/596

Primary Examiner—Robert K. Schaefer
Assistant Examiner—Thomas Langer
Attorney, Agent, or Firm—Kenyon & Kenyon Reilly Carr & Chapin

[57] ABSTRACT

A control system for positioning a motor-driven potentiometer, in which a control amplifier, which detects the difference between the actual and desired potentiometer voltage, has a feedback resistor coupled to an inverting signal input terminal and the output terminal thereof has a resistance which is chosen so that the control amplifier is driven at maximum output whenever the voltage difference is at least equal to a selected voltage difference. A control transistor coupled to the control amplifier controls the speed of the motor, so that the motor is driven at maximum speed when the output of the control amplifier is at maximum, and the speed thereof decreases linearly proportional to the amplifier output until a minimum speed, determined by a control voltage source, is reached. Bistable switching amplifiers coupled to the control amplifier energize and deenergize the motor to position the potentiometer.

6 Claims, 1 Drawing Figure

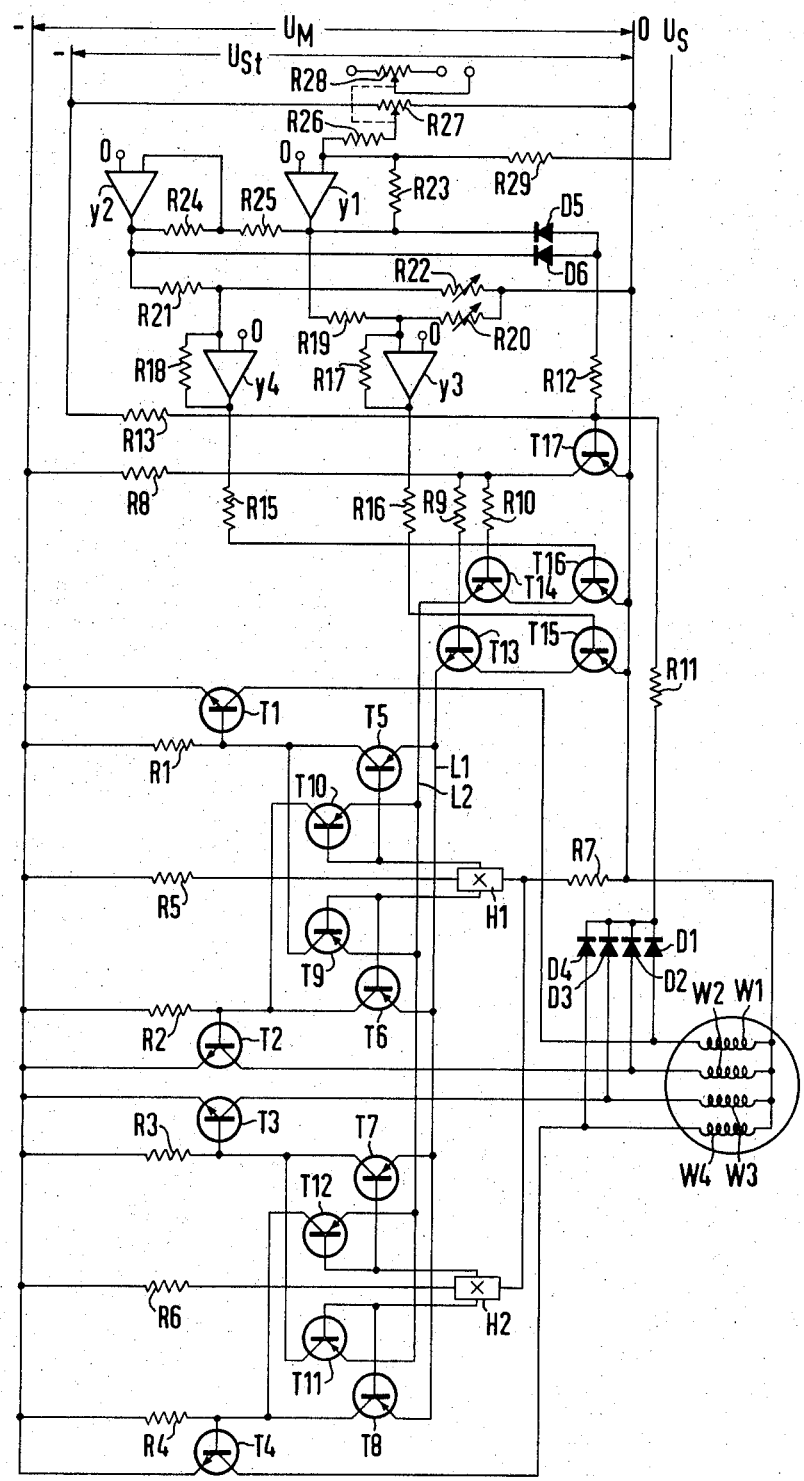

CONTROL SYSTEM FOR POSITIONING A MOTOR-DRIVEN POTENTIOMETER

BACKGROUND OF THE INVENTION

1. Field of the Invention

The invention relates to motor control systems, and in particular, to a control system for positioning a motor-driven potentiometer by means of a control signal consisting of the difference between the actual and the desired voltages at the potentiometer.

2. Description of the Prior Art

Motor-driven potentiometers are generally used to effect remote control of electromechanical devices and machines. Known control systems which are used to position such potentiometers usually include a control amplifier having an output which is linear with respect to time so that the speed at which the motor coupled to the potentiometer is driven is proportional to the difference between the actual potentiometer voltage and the desired voltage at the potentiometer. When the difference between the desired and actual voltages is reduced to zero, a comparator deactivates the drive motor. However, since such amplifiers are not truly linear, such control systems are not sufficiently accurate. Overshoot errors frequently occur, and it is difficult to obtain actual and desired potentiometer voltage values which coincide with each other. Although linear feedback amplifiers and low motor speeds have been successfully used to increase the accuracy of such positioning systems, such modifications still have not proved satisfactory since they require excessively long time periods to accurately position the potentiometer.

SUMMARY OF THE INVENTION

It is therefore an object of the invention to provide a control system for both rapidly and accurately positioning a motor-driven potentiometer.

According to the invention, the above problem is solved by providing, in an apparatus for positioning a potentiometer by means of a drive motor coupled thereto, including means coupled to the motor for energizing the motor and driving the motor at a speed and in a direction of rotation determined by a control signal consisting of the difference between the actual potentiometer voltage and the desired voltage at the potentiometer applied thereto, an improved control system, comprising a control amplifier, having an inverting signal input terminal to which the control signal is applied, and a feedback resistance means coupled to the inverting input terminal and the output terminal of the amplifier which has a resistance chosen so that the amplifier is driven at maximum output whenever the control signal is at least equal to a selected voltage. The output of the amplifier decreases linearly, proportional to the control signal when the control signal voltage is less than the selected voltage value. Motor speed control means, coupled and responsive to the control amplifier, and to the motor energizing and driving means, controls the motor driving means so that the motor is driven at a speed corresponding to the output of the control amplifier. The motor speed control means also includes means for driving the motor at a minimum speed whenever the control signal voltage is less than the selected voltage. Switching means, coupled and responsive to the control amplifier and to the motor speed control means, controls the motor driving means, and thereby the direction of rotation of the motor, and the energizing and de-energizing of the motor in response to the control signal applied to the control amplifier. Rapid, yet accurate, positioning of the potentiometer by the drive motor is thus achieved.

BRIEF DESCRIPTION OF THE DRAWING

The drawing illustrates one embodiment of a control system for positioning a motor-driven potentiometer constructed according to the invention.

DETAILED DESCRIPTION

It is to be understood that the embodiment of the invention illustrated in the accompanying drawing and described in the following detailed description is an illustrative example only, and it is not intended that the drawing and detailed description comprise a definition of the limits and scope of the invention disclosed therein.

Referring now to the drawing, there is shown a commutatorless DC drive motor, having a stator winding comprising four winding branches W1, W2, W3 and W4, which are star-connected and electrically spaced apart from each other by an angle of 90°. Each of the winding branches is coupled at one end to the null conductor line of a DC voltage source $U_M$ which drives the motor. The other ends of the winding branches are coupled to the collector terminals of a plurality of power transistors T1, T2, T3 and T4. The emitter terminals of the power transistors are coupled to the negative voltage terminal of DC voltage source $U_M$, and the base terminals thereof are connected to the collector terminals of a plurality of first drive transistors T5, T6, T7 and T8 which control the power transistors. The base terminals of drive transistors T5 and T6 are coupled to the terminals of a first Hall effect generator H1, and the base terminals of the other drive transistors T7 and T8 are connected to the terminals of a second Hall effect generator H2. Each of the Hall effect generators H1 and H2 are connected to the negative voltage terminal of voltage source $U_M$ by resistors R5 and R6, respectively. Both Hall effect generators are connected to the null line of voltage source $U_M$, and to winding branches W1–W4 by resistor R7. Drive transistors T5–T8 are driven by the Hall effect generators H1 and H2 in accordance with the position of a permanent magnet rotor (not shown) of the DC motor. The collector terminals of drive transistors T5–T8 are coupled to the corresponding base terminals of power transistors T1–T4, and to the negative voltage terminal of DC voltage source $U_M$ by first collector resistors R1, R2, R3 and R4. The emitter terminals of drive transistors T5–T8 are coupled to a first common connecting line L1.

The base terminals of a plurality of second drive transistors T9, T10, T11 and T12 are also connected to Hall effect generators H1 and H2. The collector terminals of each of these second drive transistors are coupled to the base terminals of power transistors T1–T4, the collector terminals of first drive transistors T5–T8, and by corresponding first collector terminal resistors R1, R2, R3 and R4 to the negative voltage terminal of DC voltage source $U_M$. Second drive transistors T9–T12 are coupled to power transistors T1–T4 so that the first drive transistor coupled to one terminal of either Hall effect generator and the second drive transistor coupled to the other terminal of the same generator are connected to the same first power transistor. For example, first drive transistor T5, which is connected to one of the voltage terminals of Hall effect generator H1, and second drive transistor T9, which is connected to the other voltage terminal of Hall effect generator H1, are both coupled by their collector terminals to power transistor T1. The other first and second drive transistors of the circuit are coupled to the other power transistors in a similar manner. Each of the emitter terminals of the second drive transistors is coupled to second connecting line L2.

First connecting line L1 is coupled by the collector-emitter path of positioning transistor T13, and the collector-emitter path of switching transistor T15, to the positive (null) voltage terminal of DC voltage source $U_M$, i.e., the null line of the source. Similarly, second connecting line L2 is coupled by the collector-emitter path of a second positioning transistor T14, and the collector-emitter path of a second switching transistor T16, to the positive voltage terminal of the DC voltage source, i.e., the null line. Positioning transistors 13 and 14 are also coupled to the positive voltage terminal of the voltage source by the collector-emitter path of a control transistor T17, which functions as the motor speed control means. The Hall effect generators, first and second drive transistors, and the power transistors, comprise a means for energizing the motor and driving the motor at a speed and in a direction of rotation determined by a control signal.

Control transistor T17 controls the speed of the motor. The emitter terminal thereof is coupled directly to the null line of the voltage source, and its collector terminal is coupled by a second collector resistor R8 to the negative voltage terminal of the voltage source, and by base resistors R9 and R10 to the base terminals of first and second positioning transistors T13 and T14, respectively. Resistor R11 couples the base terminal of control transistor T17, and resistor R13, to the common junction point of coupling diodes D1, D2, D3 and D4, which are connected to winding branches W1–W4 and the collector terminals of power transistors T1–T4. First base resistor R12 is coupled by a pair of decoupling diodes D5 and D6 to the output terminals of a control amplifier Y1 and a second control amplifier Y2. Second base resistor R13 couples the base terminal of control transistor T17 to the negative voltage terminal of a DC speed control voltage source $U_{st}$. The null line is common to both control voltage source $U_{st}$ and motor voltage source $U_M$.

First and second switching transistors T15 and T16 are coupled by base resistors R15 and R16 to the output terminals of first and second switching amplifiers Y3 and Y4, respectively. The switching transistors, positioning transistors, second control amplifier and switching amplifiers form in combination a switching means which controls the motor driving means and, thus, the direction of rotation thereof and the energizing and de-energizing of the motor. Each of the switching amplifiers has a positive feedback resistor, R17 in amplifier Y3, and R18 in amplifier Y4, coupled to the output terminal thereof and a non-inverting signal input terminal of each amplifier. The values of the feedback resistors are chosen so that whenever a voltage signal appears at the noninverting input terminals thereof, the amplifiers are driven immediately to saturation. When no input signal is applied there is no output from the amplifiers. Each amplifier, thus, functions as a flip-flop. First connecting resistor R19 couples the non-inverting input terminal of amplifier Y3 to the output terminal of control amplifier Y1, while first variable resistor R20 couples the noninverting input terminal thereof to the null line. Second connecting resistor R21 couples the non-inverting input terminal of amplifier Y4 to the output of inverter amplifier Y2, and second variable resistor R22 couples the non-inverter input terminal thereof to the null line. Feedback resistors R23 and R25 are coupled to the output and the inverting input terminals of amplifiers Y1 and Y2. The inverting input terminal of amplifier Y2 is coupled to the output terminal of control amplifier Y1 by a third connecting resistor R25. Fourth connecting resisotr R26 couples the inverting input terminal of amplifier Y1 to potentiometer resistor R27. In order to electrically separate the input signal to amplifier Y1, potentiometer resistor R28, which is the potentiometer which is being motor driven and which is coupled to the drive motor, is mechanically coupled to potentiometer resistor R27. Resistor R29 couples a source at the desired voltage to the input terminal of control amplifier Y1.

The operation of the control system described above is as follows:

The control signal voltage input applied to the inverting input terminal of control amplifier Y1 is the difference between the actual voltage at potentiometers R27 and R28 and the desired voltage $U_S$, which voltages are coupled to the inverting input terminal of the control amplifier by resistors R26 and R29, respectively. Feedback resistor R23 is chosen to have a value which causes amplifier Y1 to be driven to its saturation level for any control signal voltage difference applied to the inverting input terminal which is equal to or greater than a selected voltage, so that the amplifier is driven at a maximum output. This predetermined, selected, voltage is preferably chosen to be as small as possible so that the amplifier is driven at maximum output effectively as long as a voltage difference exists between the actual and desired voltages. In amplifier Y2, feedback resistor R24 provides an amplifier gain of −1 between the inverting signal input terminal and the output terminal of amplifier Y3.

When the control signal voltage difference is positive with respect to the non-inverting signal input terminal of amplifier Y1, which is coupled to the null line, a negative voltage output signal appears at the output terminal of control amplifier Y1. This negative voltage output signal causes control transistor T17 to be driven into conduction through resistor R12 and diode D5. The negative voltage signal is also applied to the non-inverting input terminal of amplifier Y3 through resistor R19, and it causes immediate saturation of the amplifier so that the amplifier switches, or flips, into one or its two stable conditions wherein the output of the amplifier Y3 is either zero or maximum. Amplifier Y3 drives switching transistor T15 into conduction through resistor R16. Connecting line L1 is then coupled by transistor T13 and transistor T15 to the null line. This causes power transistors T1–T4 to be driven into conduction by Hall effect generators H1 and H2 and first drive transistors T5–T8, in sequence, so that the motor rotates in one direction. As long as control amplifier Y1 operates at its maximum output level, control transistor T17 and positioning transistor T13 are driven at their full conduction levels, and the motor runs at its maximum speed. When, however, the control signal voltage at the inverting terminal of amplifier Y1 drops below the selected voltage the gain of amplifier Y1 decreases linearly in proportion to the control signal, i.e., the voltage difference, at its inverting input. Control transistor T17, switching transistor T15 and positioning transistor T13, are driven at linearly decreasing conduction levels to reduce the speed of the motor proportionately corresponding to the gain of amplifier Y1.

In order to ensure that the motor rotates at a minimum speed regardless of the control signal voltage input to control amplifier Y1, second base resistor R13 is coupled to the base terminal of control transistor T17, the negative voltage terminal of the control voltage source $U_{st}$, and by resistor R11 to motor winding branches W1–W4. The control voltage source applies a minimum voltage to the motor windings of the motor, and the motor is operative as long as control transistor 17 is driven into conduction, no matter what its conduction level is. As the output of the amplifier Y1 decreases linearly, the motor speed also decreases linearly until the minimum speed set by the control voltage source is reached. This ensures that the motor has sufficient momentum to move the potentiometer to the desired position. When the potentiometer reaches the desired position, the control signal voltage and the output of amplifier Y1 are zero. The signal input to the non-inverting input terminal of amplifier Y3 also drops to zero, causing the output thereof also to drop to zero, and transistor T15 to switch off, thereby disconnecting power transistors T1–T4 from the motor windings.

When the voltage difference between the actual and the desired voltage is, however, negative with respect to the noninverting input terminal of amplifier Y1, a positive voltage output signal appears at the output terminal of amplifier Y1, and amplifier Y2 becomes operative. Diode D5 prevents the positive voltage from being applied to control transistor T17 through resistor R12. The positive voltage signal is instead coupled through resistor R25 to the inverting input terminal of amplifier Y2. A negative voltage signal appears at the output terminal of amplifier Y2, which drives control transistor T17 into conduction through resistor R12 and decoupling diode D6. The signal is also applied through resistor R21 to the noninverting input terminal of amplifier Y4, which, similar to amplifier Y3, has two states. The feedback between the non-inverting input and the output terminals through resistor R18 causes the negative voltage to drive amplifier Y4 to saturation. A negative output signal at amplifier Y4 drives second switching transistor T16 and second positioning transistor T14 into conduction through resistor R16. Second drive transistors T9–T12 are coupled by positioning transistor T14 and transistor T16, and second connecting line L2 to the null line. The second drive transistors drive power transistors T1–T4 in a sequence opposite that in which the power transistors are driven by the first drive transistors T5–T8, so that the motor rotates in the opposite direction. The operation in this direction of rotation is the same as that previously described for the first direction of rotation. The drive motor is driven at full speed as long as amplifier Y1 is driven at maximum output. When the difference between the actual and desired voltages drops to the selected voltage, the motor is driven at a speed by the power transistors which is proportional to the gain of amplifier Y1, until the minimum speed set by the control voltage source $U_{st}$ is reached. The motor speed decreases linearly proportional to the conduction levels of control transistor T17. When the control signal voltage value decreases to zero, the input to amplifier Y4 from amplifier Y2 also decreases to zero, and the output of the amplifier drops from maximum to zero, thereby switching transistor T16 off and disconnecting second connecting line L2 from the null line and de-energizing the motor.

In order to enable adjustment of the sensitivity of switching amplifiers Y3 and Y4, variable resistors R20 and R22 are coupled to the non-inverting input terminal of the amplifiers and to the null line. These variable resistors enable the switching amplifiers to be optimally matched to the operating conditions of the control system.

The resistance value of feedback resistor R23 is preferably chosen so that the control signal voltage, i.e., the difference between the desired and actual potentiometer voltages, at which control amplifier Y1 is driven at maximum output is as small as possible. This permits the drive motor to be driven at full speed close to the point where the voltage difference between the actual and the desired voltages reaches zero, whereupon its speed decreases linearly until it reaches the minimum rotational speed set by the control voltage source.

While there has been disclosed herein a preferred embodiment of the invention, it will be obvious to those persons skilled in the art that many changes and modifications may be made thereunto without departing from the invention, and it is therefore intended in the appended claims to cover all such changes and modifications which fall within the true spirit and scope of the invention.

What is claimed is:

1. In an apparatus for positioning a potentiometer by means of a drive motor coupled thereto, including means for generating signals proportional to a desired and an actual potentiometer position and means for energizing the motor and driving the motor at a speed and in a direction of rotation determined by a control signal consisting of the difference between the actual and desired potentiometer position signals applied thereto, an improved control system comprising:

a control amplifier means, having an inverting signal input terminal to which the control signal is applied and an output, and a feedback resistance means coupled to said inverting signal input terminal and the output terminal of said amplifier and having a selected resistance chosen so that said control amplifier means is driven at maximum output whenever the control signal is at least equal to a selected voltage, the output of said control amplifier means decreasing linearly proportional to the control signal when the control signal voltage is less than said selected voltage;

motor speed control means, having an input coupled to and responsive to said control amplifier output, and having an output coupled to the motor energizing and driving means, for controlling the motor driving means so that the motor is driven at a speed corresponding to the output of said control amplifier, and for driving the motor at a minimum speed whenever the output of said control amplifier is less than a predetermined voltage; and switching means, having inputs coupled and responsive to said control amplifier means output and arranged to selectively couple said motor speed control means to the motor driving means to control the direction of rotation of the motor and the energizing and deenergizing of the motor, in response to the control signal applied to said control amplifier means said switching means being responsive to energize the motor for any non-zero control amplifier output and to deenergize the motor for a zero control amplifier output.

2. The control system as recited in claim 1, wherein the motor driving and energizing means includes a voltage source for driving the motor, and wherein said motor speed control means includes a control transistor, coupled to said control amplifier, the motor driving voltage source, and the motor driving means.

3. The control system as recited in claim 2, wherein said means for driving the motor at a minimum speed comprises a speed control voltage source, a first resistor coupled to said control transistor and to the negative voltage terminal of said speed control voltage source, and a second resistor coupled to said control transistor and to the motor driving and energizing means.

4. The control system as recited in claim 1, wherein said switching means comprises a second control amplifier having an inverting signal input terminal, coupled to said control amplifier means and said motor speed control means, a first switching amplifier, having a non-inverting signal input terminal, coupled to said control amplifier means, a second switching amplifier, having a non-inverting signal input terminal, coupled to said second control amplifier, and first and second transistor switching means controlled by said first and second switching amplifiers and coupling the output of said speed control to the motor driving means.

5. The control system as recited in claim 4, wherein said first and second transistor switching means comprise first and second switching transistors coupled to said first and second switching amplifiers, and first and second positioning transistors, coupled to said speed control means, the motor driving and energizing means, and said first and second switching transistors.

6. The control system as recited in claim 4, wherein said first and second switching amplifiers include feedback resistance means coupled to said non-inverting input terminals and the output terminals thereof, having a selected resistance chosen so that said switching amplifiers are driven only at maximum output and only when an input signal is applied to said non-inverting input terminals thereof by said control amplifier means and said second control amplifier.

* * * * *

UNITED STATES PATENT OFFICE
CERTIFICATE OF CORRECTION

Patent No. 3,831,075          Dated   August 20, 1974

Inventor(s)   Manfred Liska, Hans Kühnlein, Georg Kögler

It is certified that error appears in the above-identified patent and that said Letters Patent are hereby corrected as shown below:

In Column 4, line 11, change "...resistors R23 and R 25..." to --...resistors R 23 and R24...--

Signed and sealed this 19th day of November 1974.

(SEAL)
Attest:

McCOY M. GIBSON JR.          C. MARSHALL DANN
Attesting Officer            Commissioner of Patents